United States Patent [19]

Peterson

[11] B 3,914,626

[45] Oct. 21, 1975

[54] SAMPLING CIRCUIT

[75] Inventor: William Anders Peterson, Lake Parsippany, N.J.

[73] Assignee: Bell Telephone Laboratories, Incorporated, Murray Hill, N.J.

[22] Filed: Aug. 21, 1973

[21] Appl. No.: 389,639

[44] Published under the Trial Voluntary Protest Program on January 28, 1975 as document no. B 389,639.

[52] U.S. Cl. ......... 307/235 B; 307/235 R; 307/238; 307/254; 328/151

[51] Int. Cl.² ........................................ H03K 17/00

[58] Field of Search ........... 307/235, 238, 254, 314, 307/235 R, 235 B; 328/151; 340/347 SH; 332/12

[56] References Cited

UNITED STATES PATENTS

| | | | |
|---|---|---|---|
| 3,136,960 | 6/1964 | Ausfresser | 332/12 |
| 3,165,650 | 1/1965 | White | 307/314 |

*Primary Examiner*—Rudolph V. Rolinec
*Assistant Examiner*—B. P. Davis
*Attorney, Agent, or Firm*—H. L. Logan

[57] ABSTRACT

An analog voltage sampling circuit is disclosed which provides DC isolation between its input and output terminals and, furthermore, does not require any DC energizing source. The circuit takes the form of a transistor-transformer combination which utilizes strobing clock pulses as the basic source of energy to produce output sample pulses.

8 Claims, 2 Drawing Figures

SAMPLING CIRCUIT

BACKGROUND OF THE INVENTION

1. Field of the Invention

This invention relates to circuits used for sampling the amplitude of an analog voltage.

2. Description of the Prior Art

Input-output DC isolation is frequently required in pulse-width modulated DC to DC converters. The provision of such isolation in the prior art has required an additional DC source of voltage on the output side to provide a reference voltage and to energize feedback circuitry. This additional source of voltage may be provided by another secondary winding in the converter as disclosed, for example, in U.S. Pat. No. 3,701,937, issued to D. E. Combs on Oct. 31, 1972. In addition to the extra circuitry required for a source of this type, care must be exercised to insure that the control circuit becomes active before the supply output level produces an undesirable effect and, furthermore, that overloading the supply does not cause loss of control. To overcome these problems, a second converter may be used as the additional source. This approach, however, requires more circuitry than that required for the first approach. in either case, the added circuitry influences the expense, reliability, and efficiency of the converter.

SUMMARY OF THE INVENTION

An object of the invention is to eliminate the need to provide an additional DC source of voltage to power the feedback circuitry of a pulse-width modulated DC to DC converter having DC isolation between its input and output terminals.

This and other objects are achieved through the use of the present invention which takes the form of a sampling circuit having DC isolation between its input and output terminals and, furthermore, which is activated by strobing clock pulses. In particular, output sample pulses are produced by this circuit in such a manner that the energy in the sample pulses are provided by the strobing clock pulses.

An embodiment of the invention comprises a transistor and a transformer having primary and secondary windings with a one-to-one turns ratio. The collector and emitter of the transistor are connected to the extremities, respectively, of the transformer primary winding; the analog input is applied between the transistor collector and base in a polarity sense to render the transistor non-conducting; the clock pulses are applied to the transformer with a polarity to induce a voltage across the primary winding which forward-biases the transistor; and the sample outputs appear across the transformer secondary winding. When the transistor is forward-biased by the clock pulse induced voltage, the transistor functions to clamp the induced voltage to a level equal to the analog voltage plus the base-to-emitter drop of the transistor. The coupling action of the transformer results in a substantially identical output voltage across the secondary winding.

Embodiments of the invention present relatively high input impedances in both sampling and off states. In particular, current is not drawn from the analog voltage source when an embodiment is in the off state while only a relatively small base-to-emitter current is drawn when in the sampling state. Furthermore, the energy required to produce the output pulses across the transformer secondary winding is supplied solely by the clock pulses and it is these pulses which supply the transformer magnetizing current.

As noted above, the output pulses are equal in amplitude to the analog voltage plus the base-to-emitter drop of the transistor. This base-to-emitter drop, which appears as an error in the output pulses, may be substantially eliminated by adding, in series with the secondary winding, an embodiment of the invention disclosed in J. C. Wadlington patent application, Ser. No. 389,640, filed on even date herewith. This is described subsequently herein in the discussion relating to the disclosed embodiment of the present invention.

When used in pulse-width modulated DC to DC converters, embodiments of the present invention, either solely or in conjunction with embodiments of the Wadlington invention, provide DC isolation between input and output grounds. As will be discussed in detail hereinafter, such converters use the input DC source to power the entire converter.

DESCRIPTION OF THE DISCLOSED EMBODIMENT

Figure 1:
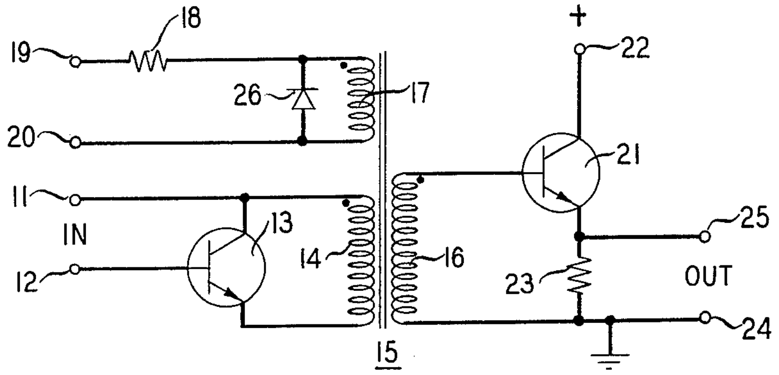
FIG. 1 is a schematic diagram of an embodiment of the invention.

The sampling circuit of FIG. 1 includes a pair of input terminals 11 and 12. The collector of an NPN transistor 13 is connected to terminal 11 while the base of the transistor is connected to terminal 12. The collector and emitter of transistor 13 are connected to respective extremities of a primary winding 14 of a transformer 15. Transformer 15 has a secondary winding 16 having the same number of turns as primary winding 14. Still further, an auxiliary winding 17 and a resistor 18 are connected in series between a pair of clock, or strobe, terminals 19 and 20. The polarity of the three windings with respect to one another is indicated through the conventional use of a dot associated with one extremity of each winding. The voltage to be sampled is applied between terminals 11 and 12 with a polarity sense so that terminal 11 is positive with respect to terminal 12. In the absence of clock pulses, the base-to-emitter junction of transistor 13 is reverse-biased and the impedance presented to terminals 11 and 12 is very large.

The clock, or strobe, pulses applied between terminals 19 and 20 are poled in a sense to drive terminal 19 positive with respect to terminal 20. Furthermore, these pulses induce voltages across winding 14 which, unless otherwise limited, exceed the maximum anticipated voltage between terminals 11 and 12 plus the base-to-emitter drop across transistor 13 when conducting. In operation, transistor 13 becomes active when the leading edge of an induced pulse reaches an amplitude equal to the voltage between terminals 11 and 12 plus the base-to-emitter drop of transistor 13 when conducting. At that time, the amplitude of the induced pulse becomes clamped to the voltage between terminals 11 and 12 plus the base-to-emitter voltage of transistor 13. Because of the transformer action, a pulse having an amplitude substantially equal to that across primary winding 14 is induced across secondary winding 16. The sample pulses appearing across secondary winding 16 are therefore substantially equal to the input voltage plus the base-to-emitter voltage of transistor 13.

At the same time the voltage across winding 14 is clamped, the voltage across winding 17 is clamped with the difference between it and the clock pulse appearing across resistor 18. Resistor 18 is, of course, not necessary when the clock source has sufficient internal impedance.

When transistor 13 is forward-biased by the induced voltage across primary winding 14, a base-to-emitter current flows in transistor 13. This current is equal to the collector current divided by the $\beta$ of the transistor. As $\beta$ is typically in the order of fifty to a hundred, it is believed readily apparent that the loading effect produced by the circuit during the sampling intervals is of a minimal nature.

The base-to-emitter voltage appearing in the sample pulses constitutes an error. In accordance with the subject matter of J. C. Wadlington patent application, Ser. No. 389,640, filed of even date herewith, a second device in the form of an NPN transistor 21 may be used to compensate for this error. In particular, the collector of transistor 21 is connected to a terminal 22; the base of transistor 21 is connected to one extremity of secondary winding 16; and the emitter of transistor 21 is connected through a resistor 23 to the other extremity of winding 16. The last-mentioned extremity of winding 16 is also connected to a point of ground potential and an output terminal 24. When in use, a positive-with-respect-to-ground potential is applied to terminal 22. A second output terminal 25 is connected to the junction between resistor 23 and the emitter of transistor 21.

In operation, the sample pulses across winding 16 forward-bias the base-to-emitter junction of transistor 21. Therefore, in addition to functioning as information converyors, the sample pulses function as clock. or strobe, pulses to enable transistor 21. The voltage drop across the base-to-emitter junction of transistor 21 is substantially equal to the base-to-emitter voltage of transistor 13 when active but is opposite in polarity to the sample pulses across winding 16. The base-to-emitter voltage of transistor 21 therefore has a subtractive effect which causes the pulses appearing at output terminals 24 and 25 to be substantially equal in amplitude to the voltage between input terminals 11 and 12.

It may be found necessary in some embodiments to reset the core of transformer 15. This may be accomplished by connecting a correctly poled diode across any one of the windings of the transformer. Such a diode and its connection is shown as diode 26 connected across auxiliary winding 17. The diode is poled oppositely with respect to the clock pulses, thus permitting current conduction for resetting.

Embodiments of the invention are not restricted, as appreciated by those skilled in the art, to the use of NPN transistors. Transistor 13 may be a PNP transistor with the same electrode connections as shown in FIG. 1. The polarity of the analog voltage, the clock pulses, and diode 26 must, however, all be reversed. Although it is desirable for compensation purposes that transistor 21 be of the same type as transistor 13, it may be of the opposite type. When it is of the opposite type, the polarity, as shown in FIG. 1, of the secondary winding must be reversed with respect to the polarity of the primary winding.

Embodiments of the invention are also not restricted to the use of an auxiliary winding. The strobing clock pulses may, for example, be applied directly across either primary winding 14 or secondary winding 16. In either case, the same limiting action is produced by the analog input voltage acting through transistor 13 so that the output at terminals 24 and 25 is a sample of the analog voltage.

The input-output direct-current isolation of the invention when combined with the Wadlington invention is particularly useful in pulse-width modulated DC to DC converters. This may be appreciated by referring to FIG. 2 which shows, in block diagram form, a conventional pulse-width modulated DC to DC converter.

Figure 2:
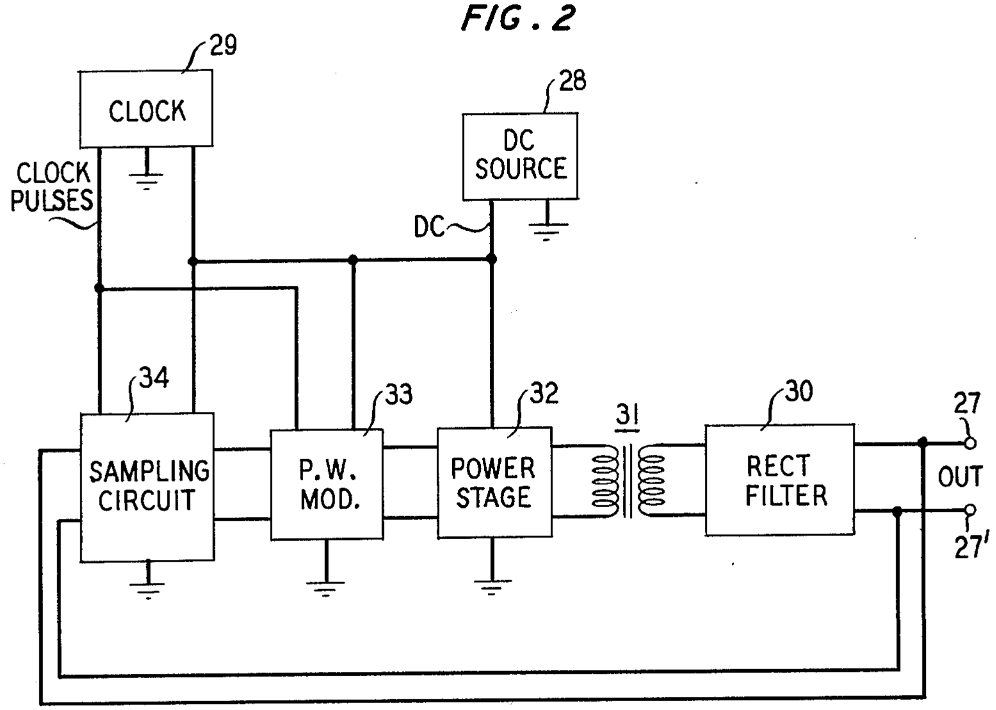
FIG. 2 is a block diagram of a pulse-width modulated DC to DC converter in which the embodiment of FIG. 1 may be used advantageously.

FIG. 2 shows a pair of output terminals 27 and 27′, a DC source 28, a clock 29, a rectifier and filter 30, a transformer 31, a power stage 32, a pulse-width modulator, 33, and a sampling circuit 34. DC source 28 is connected to clock 29, power stage 32, modulator 33, and sampling circuit 34 so that all of these circuits are powered by the source. Clock 29 is connected to modulator 33 and sampling circuit 34 so that they are strobed by the clock pulses.

Sampling circuit 34 is connected to converter output leads 27 and 27′. The sampling circuit therefore samples the converter output voltage level. The sample outputs from the sampling circuit are applied to modulator 33 which produces output pulses whose durations are inversely related to the amplitude of the sample outputs. The outputs from modulator 33 are power amplified in power stage 32 and then transformer coupled by transformer 31 to rectifier and filter 30. The output of the latter appears on terminals 27 and 27′.

In a converter of this type, DC isolation between converter output terminals 27 and 27′ and DC source 28 is frequently required. In the past this has been achieved by providing transformer coupling between the sampling circuit and the modulator or between the modulator and the power stage. With such an arrangement, however, a second DC source must be provided to power the sampling circuit and also the modulator if transformer coupling follows the modulator.

When using the embodiment of FIG. 1 in the converter of FIG. 2, DC input-output isolation is achieved without an additional transformer and an additional DC source. This is achieved because the embodiment provides input-output DC isolation at a point within the sampling circuit whereby the sampling circuit and modulator may be powered by the same source as the rest of the elements in the converter. The embodiment of FIG. 1 as shown may be used in FIG. 2 when source 28 produces a positive output voltage and clock 29 produces positive output pulses. In this case, the output terminals 27 and 27′ are connected to input terminals 11 and 12 of FIG. 1 so that the more positive of the output terminals is connected to input terminal 11. When source 28 produces a negative output voltage and clock 29 produces negative output pulses, the embodiment of FIG. 1 may be used in FIG. 2 by directly replacing, as discussed earlier, the NPN transistors with PNP transistors.

What is claimed is:

1. A sampling circuit having a transistor which in response to being gated into conduction produces at a pair of output terminals a sample of an input voltage appearing at a pair of input terminals, said circuit characterized in that:

a transformer having a primary winding and a secondary winding has its primary winding directly connected between the collector and emitter of said transistor;

said transformer remaining in a nonsaturating mode over its intended operating range;

means connect the collector and base of said transistor to said input terminals in a polarity sense to reverse-bias the base-to-emitter junction of said transistor in response to said input voltage;

a pulse source is connected to said transformer to induce a voltage across said primary winding which if not otherwise limited would exceed the summation of the amplitudes of said input voltage and the voltage across the base-to-emitter junction of said transistor when said base-to-emitter junction is forward-biased, said induced voltage being in a polarity sense to forward-bias said transistor; and means connect said secondary winding between said output terminals.

2. A sampling circuit in accordance with claim 1 in which said transformer windings have a one-to-one turns ratio.

3. A sampling circuit in accordance with claim 2 in which said transformer has an auxiliary winding and said pulse source is connected to said auxiliary winding.

4. A sampling circuit in accordance with claim 3 in which a diode is connected across one of said transformer windings with said diode poled to reset said transformer.

5. A pulse sampling circuit comprising:

a pair of input terminals for receiving an input voltage;

a pair of output terminals;

a transistor;

a transformer having at least one primary winding and one secondary winding;

means directly connecting said primary winding between the collector and emitter of said transistor;

said transformer remaining in a nonsaturating mode over its intended operating range;

means connecting the base and collector of said transistor to said input terminals in a polarity sense to reverse-bias the base-to-emitter junction of said transistor in response to said input voltage;

a current pulse source connected to said transformer to induce a voltage across said primary winding which if not otherwise limited would exceed the summation of the amplitudes of said input voltage and the voltage across the base-to-emitter junction of said transistor when said base-to-emitter junction is forward-biased, said induced voltage being in a polarity sense to forward-bias said transistor; and means connecting said secondary winding between said output terminals.

6. A sampling circuit in accordance with claim 5 in which said transformer windings have a one-to-one turns ratio.

7. A sampling circuit in accordance with claim 6 in which said transformer has an auxiliary winding and said pulse source is connected to said auxiliary winding.

8. A sampling in accordance with claim 7 in which a diode is connected across one of said transformer windings with said diode poled to reset said transformer.

* * * * *